United States Patent Office 3,190,770
Patented June 22, 1965

3,190,770
METAL CONDUCTOR COATED WITH POLYESTER OUTER LAYER AND POLYIMIDE INNER LAYER
Edward Lavin, Longmeadow, Albert H. Markhart, Wilbraham, and Charles F. Hunt, Springfield, Mass., assignors to Shawinigan Resins Corporation, Springfield, Mass., a corporation of Massachusetts
No Drawing. Filed Apr. 24, 1961, Ser. No. 104,781
8 Claims. (Cl. 117—218)

This invention relates to enameled wires; more particularly it relates to wires coated with multiple layers of cured polyester and polyimide resin compositions.

It is well known that magnet wires of "class B" or "class F," i.e. designed to operate at temperatures of up to 130° C. and 155° C. respectively, can be made by coating the bare wires with polyesters of terephthalic acid and simple polyhydric alcohol mixtures such as glycol-glycerol, glycol-glycerol-pentaerythritol and 1,3-butylene glycol-glycerol. An important defect of these wires lies in their short dielectric life at temperatures of 300° C.

Another type of magnet wire coated with certain aromatic polyamides which are converted to polyimides when cured in a wire-coating oven, has been shown to have a much higher thermal life than the polyester wires. These polyimide coatings, however, suffer from a less than adequate abrasion resistance, a rather serious shortcoming in view of the rough mechanical treatment that magnet wires undergo during high speed machine winding into coils. Another defect of these wires is that their coating tends to craze when it has not been properly annealed and this crazing, once it has occurred, will not heal with further heat treatment. Finally, polyimide wires present the further disadvantage that the application of the enamel requires a rather expensive solvent system as compared to that used with more common enamels.

In view of these facts, an object of this invention is to create a magnet wire possessing desirable improvements in the overall balance of its properties, namely an enameled wire which has good abrasion resistance accompanied by excellent dielectric stability at high temperatures.

Another object is to obtain these improvements without sacrificing any of the other chemical, physical and electrical properties that any magnet wire must possess such as dielectric strength, flexibility, good enamel adherence to metal, etc.

These and other objects are attained by applying a thin layer of a special polyamide enamel, special in that it is convertible into a polyimide upon curing, over or under several coats of polyester or modified polyester enamel. In doing so, it has been observed that the thermal life of the combination coating is considerably longer, at high temperatures, than that of either type of enamel alone. In fact, a synergistic effect boosts it beyond that which might be expected from mere addition of the protection provided by each enamel.

A synergism occurs as well in abrasion resistance when the polyimide enamel is coated under the polyester since high and unexpected results are also obtained in this capacity. It is surprising, on the other hand, that upon reversing the order of application of the two types of enamel, the abrasion resistance of the total covering is not any better than that of the polyester enamel alone.

The following examples will serve to illustrate but not to limit the invention.

Two polyester enamels and two polyamide enamels were employed in the examples. Their description follows.

The compositions of the polyester enamels are shown in the following table, in parts by weight:

Table 1

| | Enamel A | Enamel B |
|---|---|---|
| Terephthalic polyester resin | 100.0 | 100.0 |
| Polyurethane | 29.2 | |
| Cresylic acid, ml | 242 | 240 |
| Hydrocarbon solvent, ml | 60 | 60 |

All these components and enamels are well known to the trade. The terephthalic polyester resin is the reaction product of terephthalic acid with a mixture of ethylene glycol and glycerol. The polyurethane used is the phenolic adduct of the trimer of tolylene diisocyanate. The other two components are commercial cresylic acid and naphtha. In addition, each enamel contains a metallic catalyst such as zinc.

One of the polyamides employed in the examples, enamel C, is the condensation product of pyromellitic dianhydride with 4,4'-oxydianiline. The oxyaniline was recrystallized from ethyl alcohol-dimethyl acetamide, and technical pyromellitic dianhydride was purified by heating at 250° C. for two hours at 80 mm. pressure. The resulting pyromellitic dianhydride, 14.8 g., was slurried in 71 ml. dry dimethyl acetamide in a three-neck, round-bottom flask fitted with a thermometer and an air condenser, protected with a calcium chloride tube. A solution of 13.4 g. oxydianiline in 71 ml. dry N-methylpyrrolidone was added. The reaction mixture was held at 50° C. for two hours. The polyamide solution thus obtained was applied on wire. Suffice it to say at this stage that the polyamide, after it has been applied to the wire, is converted in situ to a polyimide structure during the subsequent processing of the wire.

The other polyamide enamel used in the examples, enamel D, is a commercial product; it consists essentially of a polyamide chemically identical to that in enamel C, dissolved as a 15% by weight solution in a mixture of N-methylpyrrolidone and dimethyl acetamide and having a viscosity of about 4800 centipoises at 25° C.

EXAMPLES 1–3

The enamels were applied to number 18 (0.0403 inch) copper wire by conventional wire coating means, each layer of enamel being cured by passing the dipped wire through a vertical oven 12 feet high with a set cure temperature of 350° or 390° C. at a constant rate of speed selected from the range of 10.5 to 14.0 feet of wire per minute. A split applicator was employed so that the desired number of different coats could be put on in one continuous operation.

Control wires were prepared with enamels A and B by applying six successive coats of the enamels to the bare wire. Since each coat has a thickness of approximately 0.25 mil, the resulting wires were thus given a "heavy build," i.e. they had a diameter approximately 3.0 mils larger than that of the bare original wires. "Single build" wires were also prepared by applying four 0.25 mil coats to copper wire to achieve a total diameter increase of 2 mils. In the case of the polyamides, only one two-coat single build control wire having a build of approximately 1 mil was deemed sufficient.

In all the following tables, the enamel thickness is reported in mils.

The testing of the enameled wires was done by standard procedures. Although numerous chemical, physical and electrical properties of the control wires and of the new insulated wires were tested, the description of the testing procedures will be limited to those measuring the properties in which significant changes were observed, namely the one-kilovolt life test and the scrape abrasion test. These tests were used for all the enameled wires prepared for this specification.

*1 kilovolt-life test.*—The 1 kv.-life test was made in accordance with the provisions of the American Institute of Electrical Engineers specification No. 57, dated October 1955. The test is a measure of the period for which a coating can be exposed at the particular temperature indicated before it will fail as electrical insulation upon the application of 1000 volts for one second to the sample. Ten samples are used in each test.

*The scrape abrasion test.*—This test consists essentially in scraping repeatedly the insulated wire sample with a steel needle loaded with a set weight which is varied according to the build of the wire. Accordingly a 700 g. weight was used for the "heavy build" wires (6 coats—3 mils) and a 490 g. weight for the "single build" wires (2 coats—1 mil; 4 coats—2 mils). The scraping speed employed in all instances was 60 cycles per second. The tester records the number of strokes and shuts off when contact is made between the needle and the bared wire.

Table II shows the significant properties of the control wires covered with standard enamels at optimum cure. These values will serve as a basis for evaluation of the new insulations of the later examples.

*Table II*

CONTROL ENAMELS

| Enamel | Build (mils) | Abrasion (strokes) | 1 kv.-life (hours) | | | |
|---|---|---|---|---|---|---|
| | | | 200° C. | 225° C. | 250° C. | 300° C. |
| A | 2 | 27 | 9 2,400 | 7 2,700 | 63 | 2 |
| B | 2 | 29 | 10 2,400 | 1,287 | 125 | 7 |
| D | 1 | 1 | 4 880 | 544 | 50 | 27 |

The values accompanied by a superscript are not final in that at the time indicated by the figure, e.g. 880 hours for enamel D at 200° C., a number of samples represented by the superscript, four in this case, were still resisting the conditions of the test. It will later become clear that these incomplete values do not detract from the understanding of the invention. The poor abrasion resistance of the polyimide enamel (D) as well as the relatively low thermal stability of all three enamels at 300° C. are to be noted for future reference.

EXAMPLES 4–7

Wires were then prepared with insulation consisting of four coats of a polyester enamel over two coats of a polyimide enamel. The significant properties of these new wires are summarized in Table III.

*Table III*

POLYESTER OVER POLYIMIDE ENAMELS

| Enamels and build | Cure conditions | | Abrasion (strokes) | 1 kv.-life (hours) | | |
|---|---|---|---|---|---|---|
| | Temp., °C. | Speed, ft./min. | | 200° C. | 250° C. | 300° C. |
| A | 350 | 10.5 | 222 | | | 95 |
| | | 13 | 74 | 10 2,000 | 1,452 | 134 |
| A (2 mil) on D (1 mil) | 390 | 11 | 395 | | | 76 |
| | | 14 | 89 | | | 71 |
| A (2 mil) on C (1 mil) | 390 | 11 | 95 | | | 42 |
| B (2 mil) on D (1 mil) | 390 | 11 | 135 | | | 42 |
| | | 14 | 89 | | | 55 |

A comparison of these results to the data of Table II points out readily that the introduction of two coats of a polyamide enamel between the wire and the four coats of a polyester enamel produces wires which have abrasion resistance and 300° C. thermal life that are far superior to what is achieved by the use of either enamel alone. A synergistic effect is further noted in that the new values obtained for these properties are greater than that which might have been predicted through the additive contribution of each type of enamel.

EXAMPLES 8—9

The order of application of the different enamels was then reversed, i.e. two coats of a polyamide were placed on four coats of a polyester. An appreciable advance in thermal life at 300° C. is also apparent upon comparison of the properties of these wires as shown in Table IV, with those of the control wires.

*Table IV*

POLYIMIDE OVER POLYESTER ENAMELS

| Enamels and build | Cure conditions | | Abrasion (strokes) | 1 kv.-life (hours) | | |
|---|---|---|---|---|---|---|
| | Temp., °C. | Speed, ft./min. | | 200° C. | 250° C. | 300° C. |
| D (1 mil) on A (2 mil) | 350 | 13 | 14 | 9 2,000 | 1,485 | 192 |
| D (1 mil) on B (2 mil) | 390 | 14 | 19 | | | 38 |

It may be seen, however, that the abrasion resistance has not been improved here as it was when the polyamide was coated under the polyester (Table III).

In summary then, it is shown conclusively by the examples that wire with a 300° C. thermal life superior to that of wires coated with either terephthalic polyester resins or polyamide resins can be produced by coating such wires with each type of resin successively. It is also shown that such improvement goes beyond that expected by mere addition of the effects of each type of coating. A similar synergism has been found to occur in abrasion resistance when the polyamide layers are placed under the polyester layers.

It is evident, of course, that many widely different embodiments of this invention other than those provided in the examples may be made by persons skilled in the art without departing from the scope and the spirit thereof.

For instance, any of the polyester resins disclosed in Sheffer et al., U.S.P. 2,889,304, and in Precopio et al., U.S.P. 2,936,296, may be used in this invention. The preferred resins are, for convenience, those commercially available. The polyesters of Sheffer et al., are essentially the reaction products of terephthalic or isophthalic acid with a mixture of 30 to 70% by weight of a polyhydric alcohol having at least three hydroxyl groups and 70 to 30% by weight of an α,ω-diol, 20 to 100% of this diol being a 4–5 carbon atom molecule and the rest, if any, ethylene glycol. The compositions taught by Precopio et al., on the other hand, are made by heating together from 25–56 equivalent percent of a lower alkyl ester of terephthalic or isophthalic acid, from 15 to 46 equivalent percent of ethylene glycol and from 13 to 44 equivalent percent of a polyhydric alcohol having at least three hydroxyl groups per molecule. The limiting factor of this type of polyester for use in this invention is the availability of free hydroxyl groups for reaction with polyisocyanates when this is desired.

Usable polyurethanes are polyisocyanates blocked with organic compounds containing at least one reactive hydrogen atom. These blocking agents must split off at enamel cure temperatures in order to provide free isocyanate groups to crosslink the resinous compositions of the enamel.

Suitable reactive hydrogen compounds include phenols, such as phenol, cresol, xylenols, etc., secondary aromatic amines, mono- and polyfunctional alcohols, amines, lactams, enols, and mixtures thereof. The preferred blocking agents are compounds in which an hydroxyl group is attached to an aromatic ring.

The simplest class of useful polyisocyanates can be represented by the following formula:

$$R(-N=C=O)_n$$

where R represents a member of the class consisting of aliphatic hydrocarbons containing up to 8 carbon atoms, aromatic hydrocarbons containing up to 13 carbon atoms, alicyclic hydrocarbons containing up to 6 carbon atoms, and alkyl-aryl substitutes thereof, and $n$ is an integer from 2 to 4. Suitable polyisocyanates include compounds such as phenylene diisocyanates, diphenylene diisocyanates, tolylene diisocyanates, naphthylene diisocyanates, diphenylmethane diisocyanates, cyclohexane diiocyanates, ethylene diisocyanates, tetramethylene diisocyanate, hexamethylene diisocyanate, polyaryl polyisocyanates, trimers of polyisocyanates, polyisocyanates which are the reaction products of diisocyanates or triisocyanates with polyhydric alcohols and the like, and mixtures, trimers and isomers thereof.

The polyurethanes are produced from monomers or trimers of aromatic diisocyanates which are fully blocked in order to advantageously avoid premature curing and yet obtain the rapid, uniform and complete curing required for good solvent resistance, heat stability and the numerous other properties needed for satisfactory electrical insulation.

One class of polyurethanes is made of the blocked reaction products of a polyhydric alcohol with an arylene diisocyanate. The polyhydric alcohols are in general limited to compounds containing not more than 16 carbon atoms and when used in wire enamels should preferably contain not more than 10 carbon atoms. Examples of these polyhydric alcohols are ethylene glycol, propylene glycol, glycerol, trimethylol propane, pentaerythritol, hexane-triols, etc. The class of polyurethanes is illustrated by the general formula

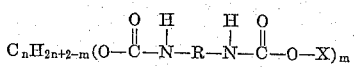

where R represents a member of the class consisting of the phenylene, methyl phenylene, naphthylene and methyl naphthylene groups, X represents a member of the class consisting of the phenyl and alkylphenyl groups, said alkyl groups containing 1–6 carbon atoms; $m$ is an integer greater than 1 but not greater than $n$ and $n$ is an integer from 2 to 10.

The preferred class of useful polyurethanes consists of blocked trimers of aromatic isocyanates and is illustrated by the general formula

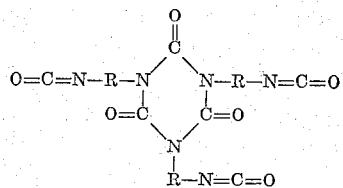

where R is an aromatic hydrocarbon radical containing up to 13 carbon atoms, or an alkyl substitute thereof. The isocyanate groups are blocked with a reactive hydrogen containing compound such as phenol. The polyurethane of the examples belongs to this class.

The polyamides useful in this invention are the condensation products of tetracarboxylic aromatic acids with diamines and may be illustrated by the recurring structural unit

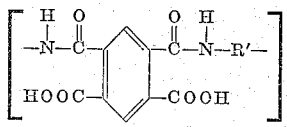

These polymers are soluble, and can be converted in situ, as mentioned earlier, by further heating into polyimide structures that are extremely resistant to solvents:

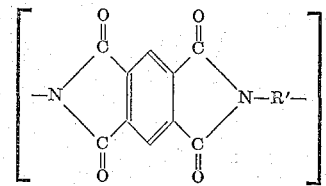

The pyromellitic acid residue incorporated in these formulae can be replaced of course with two ring tetracarboxylic acids, provided that the carboxylic groups of the latter compounds are arranged in two o-phthalic configurations. Meeting these requirements are, for example, the tetracarbocylic acids corresponding to naphthalene, diphenyl methane, 2,2'-diphenyl propane, diphenyl ether, diphenyl sulfide and diphenyl sulfone. The R' of the formulae stands for a bivalent radical of either benzene, naphthalene, biphenyl, diphenyl ether, ditolyl ether, diphenyl sulfide, diphenyl sulfone, diphenyl methane, 2,2'-diphenyl propane, benzophenone, or from a low molecular weight saturated aliphatic hydrocarbon containing not more than six carbon atoms.

The preferred class of polyamides is limited to the condensation products of pyromellitic dianhydride with a diamine characterized by a lack of aliphatic hydrogen atoms and by the possession of a flexible linkage such as the ether group of 4,4'-oxydianiline. These polyamides should preferably be such that they show a viscosity ranging from about 1300 centipoises to 5000 centipoises for a 15% by weight solution in 1:1 dimethylacetamide and N-methylpyrrolidone at 25° C.

Some of the resinous coatings that may be used in this invention are the solid reaction products, cured at 250° to 500° C., of 100 parts by weight of a terephthalic polyester with up to 60 parts of a polyurethane. The preferred balance of the properties required for insulated wire is obtained by the application of a terephthalic polyester resin containing, for every 100 parts of polyester, 10 to 50 parts of a blocked polyisocyanate, and of a polyamide resin made from pyromellitic dianhydride and 4,4'-oxydianiline.

The actual composition of the enamels employed, the number of layers of each enamel applied, the order of application of different enamels and the cure temperature are factors which must necessarily vary according to the qualities that the contemplated wire is to possess ultimately.

In cases where the abrasion resistance is to be favored, the polyester resin should be applied over the polyamide; in such cases, greater cure gives greater abrasion resistance. More care is required, however, in the manufacture of wires having the polyimide as an overcoat; such wires can be given excellent thermal life at 300° C. by adding a polyurethane to the polyester resin but in such instances high cure temperatures, e.g. 390° C., should be avoided if satisfactory mechanical properties are to be maintained, e.g. adherence to metal.

The preferred number of coats of enamels are four and two for the polyester and the polyamide respectively. This is for a heavy build magnet wire. Depending upon the diameter of the wire to be coated, the viscosity of the enamel solutions to be employed and the conditions under which the finished wire will be used, insulation of any thickness between 0.1 and 4.0 mils may be applied in 2 to 14 layers. In view of this, it is evident that no restriction to the four and two distribution of different enamel coats that is favored for heavy build wire is intended.

Various other materials such as fillers, plasticizers, coloring agents, etc., as well as minor amounts of other resins such as epoxies, may be incorporated in these enamels as is often done conventionally.

These new combinations of enamels may be used on any size of wire, on a variety of metals, and on other materials. Nonelectrical uses are also indicated where temperature stability, smoothness and resistance to abrasion are, among other properties, required of a synthetic finish.

Other applications will readily suggest themselves, of course, to those skilled in the art.

What we claim is:

1. A metal conductor coated with at least one outer layer of a polyester composition comprising the polymeric reaction product of an acid selected from the group consisting of terephthalic acid, isophthalic acid and mixtures thereof, with an $\alpha,\omega$-dihydric alcohol and a polyhydric alcohol containing at least three hydroxyl groups, and with at least one inner layer of a polyimide composition comprising the polymeric condensation product of an aromatic tetracarboxylic acid with a diamino compound selected from the group consisting of aromatic diamines containing from 6 to 16 carbon atoms and saturated aliphatic diamines containing up to 6 carbon atoms.

2. A metal conductor coated with insulation of a thickness of 0.1 to 4.0 mils consisting of 2 to 14 layers of the resins of claim 1.

3. The conductor of claim 1 coated with 4 outer layers of the polyester composition and with 2 inner layers of the polyimide composition wherein the diamino compound used is a 6 to 16 carbon atom aromatic diamine.

4. An insulated conductor comprising a metallic element coated with at least one outer layer of
   (A) a resinous composition comprising, in parts by weight, 100 parts of an hydroxyl group bearing polyester resin composed of the reaction product of an acid selected from the group consisting of isophthalic acid, terephthalic acid and mixtures thereof, with an $\alpha,\omega$-dihydric alcohol and a polyhydric alcohol containing at least three hydroxyl groups, and 5 to 60 parts of a blocked organic polyisocyanate; and at least one inner layer of
   (B) another resinous composition comprising the condensation product of an aromatic tetracarboxylic acid with a diamino compound selected from the group consisting of aromatic diamines containing from 6 to 16 carbon atoms and saturated aliphatic diamines containing up to 6 carbon atoms.

5. The conductor of claim 4 coated with 4 outer layers of the polyester composition and with 2 inner layers of the polyimide composition wherein the diamino compound is a 6 to 16 carbon atom aromatic diamine.

6. The conductor of claim 4 wherein the blocked organic polyisocyanate is the phenolic adduct of the trimer of tolylene diisocyanate.

7. A metal conductor coated with two cured inner layers of the polyamide condensation product of pyromellitic dianhydride and 4,4'-oxydianiline and with four outer layers of the polymeric condensation product of terephthalic acid, glycol and glycerol.

8. A metal conductor coated with two cured outer layers of a polyester composition comprising the polymeric condensation product of terephthalic acid, glycol and glycerol and, for every 100 parts by weight of said product, 10–50 parts of the phenol adduct of the trimer of tolylene diisocyanate, and with two cured inner layers of a composition comprising the polyamide condensation product of pyromellitic dianhydride with 4,4'-oxydianiline.

References Cited by the Examiner

UNITED STATES PATENTS

| | | | |
|---|---|---|---|
| 2,333,922 | 11/43 | Foster | 1117—75 X |
| 2,867,609 | 1/59 | Hall et al. | 117—232 X |
| 2,889,304 | 6/59 | Sheffer et al. | 117—232 X |
| 2,916,403 | 12/59 | Calderwood | 117—232 |
| 2,935,427 | 5/60 | Hall et al. | 117—232 X |
| 2,936,253 | 5/60 | Agens | 117—232 |
| 2,936,296 | 5/60 | Precopio | 117—232 X |
| 2,982,754 | 5/61 | Sheffer et al. | 117—232 X |
| 3,022,200 | 2/62 | Koerner et al. | 117—218 |
| 3,041,313 | 6/62 | Lavin et al. | 117—232 |

FOREIGN PATENTS 775,082  5/57  Great Britain.

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,190,770                               June 22, 1965

Edward Lavin et al.

It is hereby certified that error appears in the above numbered patent requiring correction and that the said Letters Patent should read as corrected below.

Column 3, line 52, for "second" read -- minute --; same column 3, Table II should appear as shown below instead of as in the patent:

Table II
CONTROL ENAMELS

| Enamel | Build (mils) | Abrasion (strokes) | 1 kv.-life (hours) | | | |
|---|---|---|---|---|---|---|
| | | | 200° C. | 225° C. | 250° C. | 300° C. |
| A---- | 3 | 45 | $^9 2,400$ | $^7 2,700$ | 63 | 2 |
| A---- | 2 | 27 | | | | |
| B---- | 3 | 50 | $^{10} 2,400$ | 1,287 | 125 | 7 |
| B---- | 2 | 29 | | | | |
| D---- | 1 | 1 | $^4 880$ | 544 | 50 | 27 | column 4, Table III, first column, line 1 thereof, for "A" read -- A (2 mil) on D (1 mil) --.

Signed and sealed this 14th day of December 1965

(SEAL)
Attest:

ERNEST W. SWIDER                              EDWARD J. BRENNER
Attesting Officer                          Commissioner of Patents